United States Patent
Pelliconi et al.

(10) Patent No.: US 6,376,613 B1
(45) Date of Patent: Apr. 23, 2002

(54) POLYOLEFINIC COMPOSITIONS FOR THE MANUFACTURE OF ARTICLES FOR BIOMEDICAL USE

(75) Inventors: Anteo Pelliconi, Santa Maria Maddalena; Rosanna Silvestri, Schio; Vittorio Braga; Luigi Resconi, both of Ferrara, all of (IT)

(73) Assignee: Basell Technology Company BV., Hoofddorp (NL)

( * ) Notice: Subject to any disclaimer, the term of this patent is extended or adjusted under 35 U.S.C. 154(b) by 0 days.

(21) Appl. No.: 08/384,520

(22) Filed: Feb. 6, 1995

(30) Foreign Application Priority Data

Feb. 7, 1994 (IT) .......................... MI94A0212

(51) Int. Cl.$^7$ ........................... C08L 53/00; C08L 23/10
(52) U.S. Cl. ..................................... 525/240
(58) Field of Search .......................... 525/240

(56) References Cited

U.S. PATENT DOCUMENTS

| | | | |
|---|---|---|---|
| 3,487,128 A | * | 12/1969 | Okazaki et al. |
| 4,335,225 A | * | 6/1982 | Collette et al. |
| 4,386,179 A | | 5/1983 | Sterling |
| 5,212,246 A | * | 5/1993 | Ogale |
| 5,420,217 A | * | 5/1995 | Canich .................. 526/127 |

FOREIGN PATENT DOCUMENTS

| | | | |
|---|---|---|---|
| DE | 2756614 | * | 6/1979 |
| EP | 0 287 482 | | 10/1988 |
| EP | 0455813 | * | 6/1991 |
| EP | 0455 813 | | 11/1991 |
| EP | 0 472 946 | | 3/1992 |
| EP | 0527589 | * | 2/1993 |
| EP | 0 604 917 | | 7/1994 |
| GB | 863414 | | 3/1961 |
| JP | 4202258 | * | 2/1967 |

OTHER PUBLICATIONS

Seymour et al–Advances in Polyolefins–Plenum Press–1987 pp. 363.*
European Search Report for EP 95 10 1217, European counterpart for present application.(1995).
Derwent Abstract for J.P.A. 42 022 528 (AN 68–95374P) (1967).

* cited by examiner

Primary Examiner—D. R. Wilson
(74) Attorney, Agent, or Firm—Bryan Cave LLP

(57) ABSTRACT

Polyolefinic compositions comprising:
(A) 1–99% by weight of a propylene amorphous polymer, and
(B) 1–99% by weight of a copolymer selected from
   (B$'$) a copolymer of propylene with ethylene and/or alpha-olefins $C_4$–$C_{10}$, and
   (B$''$) a composition comprising:
      (a) 10–50% by weight of an isotactic polypropylene with ethylene and/or alpha-olefins $C_4$–$C_{10}$;
      (b) 0–20% by weight of a copolymer containing ethylene, insoluble in xylene, and
      (c) 40–80% by weight of an elastomeric copolymer of ethylene with propylene and/or alpha-olefins $C_4$–$C_{10}$, optionally with small amounts of diene.

These compositions are endowed with good mechanical and optical properties and are suitable for the manufacture of articles for biomedical applications.

5 Claims, No Drawings

POLYOLEFINIC COMPOSITIONS FOR THE MANUFACTURE OF ARTICLES FOR BIOMEDICAL USE

BACKGROUND OF THE INVENTION

1. Field of the Invention

The present invention relates to polyolefinic compositions having elastic properties and to the use thereof for the manufacture of shaped articles for biomedical use.

2. Description of the Prior Art

The most used material for the manufacture of flexible articles for biomedical use is represented by the plastified poly-vinyl chloride (PVC). The high characteristics of flexibility of the plastified PVC are due to the plasticizers contained in it.

However, the migration and extractability of plasticizers in biological liquids, with the consequent possible negative effects on the health of the patient represent a still unsolved drawback.

In addition, it has to be taken in mind the surface migration of the additives based on organo-polysiloxane oils used in PVC as external lubricants to give to the PVC surface a critical surface tension intended to avoid blood coagulation phenomena. In fact, the organo-polysiloxane compounds tend to exude from the PVC surface thus causing problems deriving from their poor compatibility with blood (see European patent application EP-A-287 482).

Therefore, the need of materials substitutive of PVC in these fields is highly felt.

Other materials suitable for the manufacture of flexible devices for biomedical use are the styrene-ethylene-butene-styrene block copolymers (SEBS). SEBS modified with polysiloxanes have been for example suggested as substitutive of PVC and silicon resins for the realization of some devices, such as endotracheal tubes (U.S. Pat. No. 4,386,179). These copolymers combine good properties of optical transparency and flexibility also at low temperatures.

U.S. Pat. No. 4,335,225 describes the preparation of high molecular weight polypropylene showing elastomeric characteristics and processable by the technologies of thermoplastic materials and suggests a possible use of this polypropylene for the manufacture of some articles for biomedical use. The polymerization is carried out using as catalyst the product of the reaction of an organic derivative of zirconium, generally tetra-neophil-zirconium, with hydroxilated alumina. However, the content of aluminium in the polymer obtained is always very high, higher than 1000 ppm. Till now, the above mentioned materials did not find any meaningful application in the biomedical field.

SUMMARY OF THE INVENTION

It has now unexpectedly been found a new polymeric material suitable for the manufacture of articles for biomedical applications, which combines a good set of mechanical properties with good optical properties and that, furthermore, does not show problems related to the extractability of metals in biological fluids.

Therefore, an object of the present invention is a thermoplastic composition comprising:

(A) from 1 to 99% by weight of a propylene amorphous polymer having the following characteristics:
$[\eta] > 1$ dl/g
% syndiotactic diads (r)–% isotactic diads (m)>0;
less than 2% of the $CH_2$ groups contained in sequences $(CH_2)_n$, with n>2;
Bernouillianity index (B)=1±0.2;

(B) from 1 to 99% by weight of a component selected from:

($B^I$) a copolymer of propylene with at least a comonomer selected from ethylene and the α-olefins of formula $CH_2=CHR$ wherein R is an alkyl radical containing from 2 to 8 carbon atoms, said copolymer containing at least 85%, preferably 90–99%, by weight of units deriving from propylene, and ($B^{II}$) a polyolefinic composition comprising:

(a) 10–50%, preferably 10–40% and more preferably 20–35%, by weight of at least a polymer selected from a propylene homopolymer having an isotactic index higher than 80, preferably higher than 85, and a copolymer of propylene with at least a comonomer selected from ethylene and the α-olefins of formula $CH_2=CHR$ wherein R is an alkyl radical containing from 2 to 8 carbon atoms, said copolymer containing at least 85%, preferably 90–99%, by weight of units deriving from propylene, (b) 0–20%, preferably 0–15%, by weight of a copolymer containing ethylene, insoluble in xylene at room temperature, and (c) 40–80%, preferably 50–70%, by weight of a copolymer containing 10–40% by weight of units deriving from ethylene, 90–60% by weight of units deriving from at least a comonomer selected from propylene and the α-olefins of formula $CH_2=CHR$ wherein R is an alkyl radical containing from 2 to 8 carbon atoms, 0–5% of units deriving from a diene, said copolymer being soluble in xylene at room temperature and having an intrinsic viscosity comprised between 1.5 and 4 dl/g;

wherein the sum of components (b) and (c) is. comprised between 50 and 90% by weight on the polyolefin olefinic composition and the ratio of the amounts by weight of components (b)/(c) is lower than 0.4.

Another object of the present invention is a shaped article for biomedical use, obtainable from a thermoplastic composition according to the invention.

DESCRIPTION OF THE PREFERRED EMBODIMENTS

The ratio of the amounts by weight of components (A)/(B) in the composition of the present invention is preferably comprised between 10:90 and 90:10 and, more preferably, between 25:75 and 75:25.

The propylene polymers of the component (A) in the composition of the invention, together with the process for the preparation thereof, are described in the European patent application EP-A-604 917, the content of which is intended included in the present description.

These propylene polymers are amorphous, can be obtained directly from the polymerization reaction of propylene, and have the following characteristics:

(a) intrinsic viscosity $[\eta]$ greater than 1 dl/g;

(b) the percentage of syndiotactic diads (r) minus percentage of isotactic diads (m) is greater than 0;

(c) less than 2% of the $CH_2$ groups are contained in sequences $(CH_2)_n$, with n greater than or equal to 2;

(d) Bernouillianity index (B)=1+0.2.

These propylene polymers are essentially free of crystallinity. Their melting enthalpy values are generally lower than 20 J/g and, preferably, lower than 10 J/g. In most cases, they have melting enthalpy values of 0 J/g.

Preferably, the above mentioned propylene amorphous polymers show intrinsic viscosity values higher than 1.5 dl/g and more preferably higher than 2 dl/g.

$^{13}$C-N.M.R. analysis carried out on the above mentioned ethylene amorphous polymer gives information on the tacticity of the polymeric chains, that is, on the distribution of the configurations of the tertiary carbon atoms.

The structure of these polymers appears substantially atactic. Nevertheless, it is observed that syndiotactic diads (r) appear to be more numerous than the isotactic ones (m). Preferably, %r–%m>5.

The Bernouillianity index (B), defined as:

$$B=4[mm][rr]/[mr]^2$$

has values near the unit, in particular comprised within the range 0.8–1.2 and preferably comprised within the range 0.9–1.1.

The structure of these propylene polymers appear to be highly regioregular. In fact, from the $^{13}$C-N.M.R. analysis signals relating to sequences $(CH_2)_n$, wherein n>2, are not detectable. Therefore, less than 2% and preferably less than 1% of $CH_2$ appears contained in sequences $(CH_2)_n$, wherein n>2.

Molecular weights of the above mentioned propylene polymers are not only high, but distributed within rather narrow ranges. An index of the distribution of molecular weight is represented by the ratio $M_w/M_n$ which appears to be generally lower than 5, preferably lower than 4 and more preferably lower than 3.

The polyolefinic compositions which form the component (B″) of the composition according to the present invention, together with the process for the preparation thereof, are described in European patent application EP-A-472 946, the content of which is intended included in the present description.

The thermoplastic compositions according to the invention can contain additives able to give particular properties to the articles for the manufacture of which the composition is designed.

Additives useable are those generally used in the polymeric thermoplastic compositions such as for example stabilizers, anti-oxidizing agents, anti-corrosion agents, etc.

Furthermore, the compositions of the invention can contain organic or inorganic, also polymeric, fillers. These additives and fillers can be used in conventional amounts, as known to those skilled in the art or as easily determined by routine tests, generally up to 5% by weight on the final composition.

The thermoplastic compositions of the present invention can be prepared by admixture of the components in internal mixers of the Banbury type.

The compositions of the invention are generally obtained in form of pellets. These can be transformed into manufactured articles by the generally used processes for the processing of thermoplastic materials, such as injection molding, extrusion, etc. The obtained manufactured articles are endowed with elasto-plastic properties particulary interesting for biomedical articles.

The high elasto-plastic properties of the compositions of the invention are made clear by low tensile set values; for example, the residual deformation after 100% elongation (10 min., 23° C.) is generally lower than 30%. Furthermore the compositions of the invention are characterized by high ultimate tensile strength, generally higher than 4 MPa, with deformation generally higher than 300%.

The optical properties are evaluated by measuring on a 1 mm thickness plate, the amount of transmitted light which deviates from the original incidence angle ("haze"). The composition of the invention are characterized by "haze" values generally lower than 60%, preferably lower than 50%.

Therefore, the composition of the invention, differently from their single components, shows a good combination of elastomeric properties, thermoplastic processability and optical transparency.

In fact, the component (A), although showing very good optical properties, generally is not endowed with satisfactory values as to the ultimate tensile strength.

On the contrary, the component (B), endowed with high ultimate tensile strength, has insufficient light transparency properties, and the elastic recovery properties are worse in comparison with the compositions of the invention (higher tensile set values).

Taking into account the above mentioned mechanical properties and the good compatibility with blood and soft tissues, the compositions of the invention are particulary suitable for the manufacture of articles for biomedical applications.

As articles for biomedical applications, the articles for the contact with biologic or injectable fluid are intended. Examples of manufactured articles according to the present invention are tubes for enteral or extra buccal feeding, tubes for peristaltic pumps, catheters, devices for hemodialysis, bags for blood or plasma, seals for syringes, artificial organs and similar applications.

Owing to the transparency characteristics of the compositions used for the manufacture of the above mentioned articles, particulary interesting are the devices for containing, supplying, drainage and transport of blood and biologic or physiologic fluids, such as for instance intravenous catheters, dialysis tubes, bags for blood and physiologic solutions and similar applications. In fact it is easy to detect inside the devices the presence of bubbles, blood coagules, scales of biomineral origin inside the devices for dialysis, presence of extraneous material, etc.

The possibility of sterilization by treatment with radiations, in particular gamma radiations, according to known technologies or by chemical way (aseptic sterilization), the resistance to solvent used in hospitals, the non adsorption of drugs, the weldability according to known welding techniques, the dimensional stability are further interesting characteristics of the manufacture articles of the invention.

Further advantages are made clear by the examples which are given to illustrate and not to limit the invention.

CHARACTERIZATION

The intrinsic viscosity [η] was measured in tetrahydronaphthalene at 135° C.

The $^{13}$C-N.M.R. analysis of polymers were carried out with an instrument Bruker AC200 at 50323 Mhz, using $C_2D_2Cl_4$ as solvent (about 300 mg of polymer dissolved in 2.5 ml of solvent) at a temperature of 120° C.

The molecular weight distribution was determined by GPC carried out on instrument WATERS 150 in orthodichlorobenzene at 135° C.

The Differential Scanning Calorimetry measurements (DSC) were carried out on an instrument DSC-7 by Perkin Elmer Co. Ltd. according to the following procedure. About 10 mg of sample were heated from 40° C. to 200° C. at a rate of 20° C./min; the sample was kept at 200° C. for 5 minutes and thereafter it was cooled to 40° C. at the same rate. Thereafter a second heating scan was carried out according to the previous conditions. The values reported are reheat values.

The ethylene content in copolymers was determined by infrared spectroscopy (I.R.).

Melt Flow Ratio (MFR) values were determined by the method ASTM-D 1238, conditions L.

Physico-mechanical characterizations were carried out according to the hereinafter indicated methods:

| tensile set | ASTM-D 412 |
| tensile modulus ($E^I$) | ASTM-D 4065 |
| ultimate tensile strength | ASTM-D 412 specimen type C |
| ultimate elongation | ASTM-D 412 specimen type C |
| Shore hardness (A) | ASTM-D 2240 |
| haze | ASTM-D 1003 |

The above mentioned physico-chemical characterizations were carried out on specimens cut from a 1 mm thickness plate, prepared by compression molding under the following conditions: 5 minutes at 200° C. in the absence of pressure, then 5 minutes under pressure, thereafter cooling to 23° C. under pressure with circulating water.

EXAMPLE 1 (Comparison)

Preparation of the Component (A1)

Into 1 litre glass Buchi autoclave, provided with jacket, screw agitator and thermoresistance, and joined to a thermostate for controlling the temperature, degassed with $AlIBu_3$ in hexane solution and warm dried under nitrogen stream, 0.4 l. n-hexane (purified by passage on alumina columns) was supplied under nitrogen and the temperature was raised to 50° C.

The solution of the catalyst was prepared as follows: 15.8 mg of silandiyl-bis(fluorenyl)zirconium dichloride, prepared pared as described in the Example 1 of the European patent application EP-A-604 917, and 229.3 mg of methylaluminoxane (MAO) were dissolved in 10 ml of toluene.

The MAO used is a commercial product (Shering, MW 1400) in 30% b.w. toluene solution. After having removed the volatile fractions under vacuum, the vitreous material was crushed until a white powder was obtained, this was further treated under vacuum (0.1 mm Hg) for 4 hours at a temperature of 40° C. The powder thus obtained showed good flowing properties.

3.8 ml of the catalyst solution were transferred to 20 ml of toluene containing 1.043 mg of MAO and this solution was injected into the autoclave at 50° C., under propylene flow. The autoclave was pressurized at 4 ata of propylene and the polymerization was carried out for 90 minutes.

After coagulation in methanol and drying 49 g of solid and transparent propylene, having intrinsic viscosity of 1.41 dl/g, were separated. The $^{13}C$-N.M.R. analysis of signals of methyl groups gave the following composition in triades: % mm=16.9; % mr=48.5; % rr=34.6; B=0.99; % r–% m=17.7; signals corresponding to sequences $(CH_2)_n$, wherein $n \geq 2$ were not detected. The GPC analysis gave the following values: $M_w$=200,000; $M_w/M_n$=3.5. From the DSC measurement did not appear any peak attributable to melting enthalpy ($\Delta H_f$).

Data attributable to the mechanical and optical characterizations of the component (A1) are reported in Table 1.

EXAMPLE 2 (Comparison)

Preparation of the Component (A2)

Into a 1.35 litre stainless steel autoclave, degassed in warm under propylene flow, 480 g of propylene were supplied at 40° C. By propylene overpressure, 23 ml of a toluene solution containing 846 mg of MAO and 4 mg of dimethylsilandiyl-bis-(fluorenyl)zirconium dichloride were injected. The temperature was raised to 50° C. and the polymerization reaction was carried out for 1 hour.

After having degassed the unreacted monomer and dried the product, 100 g of solid and transparent polypropylene, soluble in chloroformium in warm, having intrinsic viscosity 2.23 dl/g were separated.

Data relating to the mechanical and optical characterization of the component (A2) are reported in Table 1.

EXAMPLE 3 (Comparison)

Preparation of the Component (A3)

Into a 1.35 litre stainless steel autoclave, degassed in warm under propylene flow, 480 g of propylene were introduced at 40° C. By propylene overpressure, 9 ml of a toluene solution containing 106 mg of MAO and 4 mg of dimethylsilan-diyl-bis-(fluorenyl)zirconium dichloride were injected. The temperature was raised to 50° C. and the polymerization reaction was carried out for 1 hour.

After having degased the unreacted monomer and dried the product, 83 g of solid and transparent polypropylene, soluble in chloroformium in warm, having intrinsic viscosity 3.65 dl/g were separated.

Data relating to the mechanical and optical characterizations of the component (A3) are reported in table 1.

EXAMPLE 4 (Comparison)

Preparation of the Component (B1)

A commercial product HIFAX 7036 by Himont Inc. was used; this had the following composition:

(a) 29% by weight of a copolymer of propylene with ethylene containing 3.5% by weight of units deriving from ethylene, having MFR=20 g/10';

(b) 71% by weight of a bipolymer of ethylene with propylene, containing 27.5% by weight of units deriving from ethylene, having intrinsic viscosity 3.4 dl/g.

Data relating to the mechanical and optical characterizations of the component (B) are reported in Table 1.

EXAMPLE 5

Preparation of a Composition (A1)/(B1)

12 g of the component (A1), 28 g of the component (B1) and 0.2% by weight on the total weight of the composition of antioxidizing agent Irganox B215 (CIBA/GEIGY), were mixed in a mixer Branbender Plasicorder PLD651 Mixer W50 at 200° C. for 5 minutes, then compression molded under the above described conditions.

Data relating to the mechanical and optical characterizations of the composition are reported in Table 1.

EXAMPLES 6–8

Preparation of Compositions (A2)/(B1)

These compositions were obtained by operating according to the procedure described in example 5, but using the component (A2) instead of the component (A1), and working with 40 g in total of the components (A2) and (B1), but in different ratios.

The percentages by weight of the components (A2) and (B1) present in the compositions, as well as data relating to the mechanical and optical characterizations of the compositions are reported in Table 1.

EXAMPLE 9

Preparation of a Composition (A3)/(B1)

This composition was obtained by operating according to the procedure described in example 5, but using 50 g of the component (A3) instead of the component (A1), and 50 g of the component (B1).

Data relating to the mechanical and optical characteristics of the compositions are reported in Table 1.

EXAMPLE 10

Preparation of a Composition (A2)/(B1)

14 g of component (A2) and 26 g of a component (B1) were mixed in a 13 litres internal mixer, pelletized and extruded by a Bandera extruder having 45 mm diameter and length/diameter ratio (L/D)=17, in form of tubular specimens having inside diameter=2.6 mm, outside diameter 3.6 mm and thickness=0.5 mm.

Data relating to the mechanical and optical characterizations of the composition are reported in Table 1.

The suitability of the composition to the manufacture of articles designed for biomedical applications was experimentally proved by subjecting the above mentioned tubular specimens to the following tests:

stretching test—a specimen of length=61 cm was hand stretched until the length was doubled;
the absence of cracks means that the test has been passed;

"knot test"—a simple overhand knot was tied from a specimen of about 30.5 cm length; and pulled tight at a slow rate then it was untied; this test is considered to be passed if the tubing does not bind or stick to itself so that the flow of liquids through the tube itself is not blocked;

"kink test"—a specimen was kept bent by a clamp of V type for 6 hours at room temperature and thereafter set free; the tube did not remain obstructed and showed neither bends or necks.

Metals contained in the compositions of the invention are substantially non extractable by contact with biologic fluids and this appears particulary advantageous in biomedical applications.

EXAMPLE 11

Preparation of a Composition (A2)/(B2)

This composition was obtained operating according to the procedure described in example 5, but using 28 g of component (A2) instead of component (A1) and 12 g of a commercial product EP2–C by Himont Inc. (component (B2)), random copolymer of propylene with ethylene containing 3% by weight of ethylene units.

Data relating to the mechanical and optical characterizations of the composition are reported in Table 1.

| comp.(A) (% by weight) | | | comp.(B) (% b.w.) | | tensile tension set | | | tensile modulus E' | | ultimate stress | elonga- tion | ultimate Hardness A | haze |
|---|---|---|---|---|---|---|---|---|---|---|---|---|---|
| Example | (A1) | (A2) | (A3) | (B1) | (B2) | 100% | 200% | 300% | MPa | (MPa) | (%) | (° Shore) | (%) |
| 1 (COMPAR) | 100 | 0 | 0 | 0 | 0 | 44 | broken | broken | 7.8 | >0.6 | >1000 | 40 | — |
| 2 (COMPAR) | 0 | 100 | 0 | 0 | 0 | 18 | broken | broken | 5.3 | >1.2 | >1000 | 42 | 15 |
| 3 (COMPAR) | 0 | 0 | 100 | 0 | 0 | 14 | 42 | 98 | 0.7 | 1.2 | 725 | 39 | — |
| 4 (COMPAR) | 0 | 0 | 0 | 100 | 0 | 38 | 88 | 156 | 95 | 18.1 | 690 | 90 | 93 |
| 5 | 30 | 0 | 0 | 70 | 0 | 30 | 65 | 106 | 47 | 14.8 | 870 | 76 | — |
| 6 | 0 | 70 | 0 | 30 | 0 | 20 | 42 | 64 | 10.5 | >4.8 | >1000 | 56 | 26 |
| 7 | 0 | 50 | 0 | 50 | 0 | 18 | 38 | 62 | 17 | >9.8 | >1000 | 67 | 34 |
| 8 | 0 | 30 | 0 | 70 | 0 | 20 | 46 | 78 | 37 | 11.1 | 970 | 78 | 55 |
| 9 | 0 | 0 | 50 | 50 | 0 | 16 | 34 | 56 | 11 | 9.0 | 930 | 66 | 44 |
| 10 | 0 | 35 | 0 | 65 | 0 | 15 | — | — | — | 8.1 | 1000 | 76 | 50 |
| 11 | 0 | 30 | 0 | 0 | 70 | 12 | — | — | — | 5.0 | 1100 | 77 | 50 |

What is claimed is:

1. A thermoplastic composition comprising:

(A) from 1 to 99% by weight of an amorphous propylene polymer having the following characteristics:
  (i) intrinsic viscosity greater than 1 dl/g;
  (ii) percentage of syndiotactic diads (r) minus percentage of isotactic diads (m) greater than 0;
  (iii) less than 2% of the $CH_2$ groups contained in the sequences $(CH_2)_n$, with n greater than or equal to 2;
  (iv) Bernouillianity index (B)=1±0.2;
  (v) melting enthalpy value lower than 10 J/g; and
  (vi) a ratio of $M_w/M_n$ lower than 4; and (B) from 1 to 99% by weight of a component $B''$ having the following composition:
  (a) 10–50% by weight of at least one polymer selected from the group consisting of propylene homopolymers having an isotactic index higher than 80, and copolymers of propylene with at least one comonomer selected from ethylene and the α-olefins of formula $CH_2$=CHR wherein R is an alkyl radical containing from 2 to 8 carbon atoms, said copolymer containing at least 85% by weight of units deriving from propylene,
  (b) 0–20% by weight of a copolymer containing ethylene, insoluble in xylene at room temperature, and (c) 40–80% by weight of a copolymer containing 10–40% by weight of units deriving from ethylene, 90–60% by weight of units deriving from at least one comonomer selected from the group consisting of propylene and the α-olefins of formula $CH_2=CHR$ wherein R is an alkyl radical containing from 2 to 8 carbon atoms, and 0–5% of units deriving from a diene, said copolymer being soluble in xylene at room temperature and having an intrinsic viscosity from 1.5 to 4 dl/g;

wherein the sum of components (b) and (c) is from 50 to 90% by weight of the polyolefinic composition and the ratio of the amounts by weight of components (b)/(c) is lower than 0.4.

2. The thermoplastic composition according to claim 1, wherein the ratio of the amounts of components (A)/(B) is from 10:90 to 90:10.

3. The thermoplastic composition according to claim 1, wherein the ratio of the amounts of components (A)/(B) is from 25:75 to 75:25.

4. A shaped article for biomedical use, obtainable from a thermoplastic composition according to claim 1.

5. The thermoplastic composition of claim 1, wherein the melting enthalpy of component (A) is 0 J/g.

* * * * *

UNITED STATES PATENT AND TRADEMARK OFFICE
CERTIFICATE OF CORRECTION

PATENT NO.  : 6,376,613 B1
DATED       : April 23, 2002
INVENTOR(S) : Anteo Pelliconi et al.

It is certified that error appears in the above-identified patent and that said Letters Patent is hereby corrected as shown below:

<u>Title page,</u>
Item [56], please change "EP 95 10 1217" to -- EP 94 10 1217 --

Signed and Sealed this

Third Day of December, 2002

JAMES E. ROGAN
*Director of the United States Patent and Trademark Office*